United States Patent [19]

Mundorff

[11] Patent Number: 4,465,515

[45] Date of Patent: Aug. 14, 1984

[54] PISTON RING FOR INTERNAL COMBUSTION ENGINE

[75] Inventor: Frank Mundorff, Steyr, Austria

[73] Assignee: M.A.N. Maschinenfabrik Augsburg-Nürnsberg Aktiengesellschaft, Augsburg, Fed. Rep. of Germany

[21] Appl. No.: 286,654

[22] Filed: Jul. 24, 1981

[30] Foreign Application Priority Data

Aug. 2, 1980 [DE] Fed. Rep. of Germany ....... 3029420

[51] Int. Cl.³ .............................................. B22F 5/02
[52] U.S. Cl. .................................. 75/243; 75/228; 419/11; 419/49; 29/156.6
[58] Field of Search ............... 75/228, 243; 419/11, 419/49

[56] References Cited

U.S. PATENT DOCUMENTS

| | | | |
|---|---|---|---|
| 2,196,875 | 4/1940 | Sandler et al. | 75/228 |
| 2,250,099 | 7/1941 | Hensel | 75/245 |
| 2,741,287 | 4/1956 | Koehler | 150/52 R |
| 2,881,511 | 4/1959 | Boegehold | 419/11 |
| 3,419,363 | 12/1968 | Sliney | 428/545 |
| 3,461,069 | 8/1969 | Waldhüter | 419/11 |
| 4,039,296 | 8/1977 | Levinstein | 419/11 |
| 4,222,430 | 9/1980 | Lindner | 164/61 |

FOREIGN PATENT DOCUMENTS 2015397  9/1979  United Kingdom .

OTHER PUBLICATIONS

Cameron et al., "Tribaloy Intermetallic Materials: New Wear & Corrosion Resistant Alloys", *Anti-Corrosion*, Apr. 1975, pp. 5–8.

Hirschhorn, *Introduction to Powder Metallurgy*, American Powder Metallurgy Institute, N.Y., (1969), pp. 107–109.

A. F. Belov et al.—Soviet Physics Doklady, vol. 24, No. 7, Jul. 1979, pp. 569–571.

H. C. Yeh et al.—American Ceramic Society Bulletin, vol. 58, No. 4, Apr. 1979, pp. 444–447.

*Primary Examiner*—Benjamin R. Padgett
*Assistant Examiner*—Anne Brookes
*Attorney, Agent, or Firm*—Frishauf, Holtz, Goodman & Woodward

[57] ABSTRACT

To provide piston rings which are ductile, can be heavily thermally loaded, and are not attacked by corrosive residues occurring upon combustion of residual oil or other sulfur-containing heavy Diesel oils, a powder mixture is sintered in an isostatic hot-pressure sintering process in which a hard metal and a soft filler material are combined; in accordance with one embodiment, the base is a hard metal using nickel or cobalt-based alloys present in 40–80% by weight, the remainder filler which, for example, is unrefined or galvanically coated graphite; in a second embodiment, the base is a soft material such as a high-copper content bronze, and the filler is a nickel or cobalt-based alloy, with the base metal being present in 60–80%, the filler being the remainder (all percentages by weight). Isostatic hot compression results in piston rings which can operate, under emergency conditions, without, or with only insufficient lubrication, have high strength, resistance to attack by corrosive substances, and have sufficient ductility for simple assembly and long wear.

10 Claims, No Drawings

PISTON RING FOR INTERNAL COMBUSTION ENGINE

The present invention relates to piston rings for internal combustion engines, and more particularly to the composition of which piston rings are made.

BACKGROUND

It has previously been proposed—see German Pat. No. DE-PS 814 683—to construct piston rings of a sintered powdered light metal which includes additives of heavy metals having high melting temperature. The powdered light metal which is proposed in the aforementioned patent is aluminum powder which has mixed in as a heavy metal, in powder form of fine grain size, magnesium, beryllium, lithium, silicon, copper, nickel, chromium, cobalt, titanium, manganese tungsten, and other heavy metals. The mixture then was sintered at suitable high temperature and under high pressure.

At the time of the aforementioned disclosure, that is, at the time of filing the aforementioned German Pat. No. 814 683, that is, on Oct. 2, 1948, the hot isostatic pressing process was not yet known. Thus, the method used for sintering was the customary hot pressure process in which the powder to be sintered was introduced into a high-pressure, form-stable mold, and compressed by presses operating under high pressure force by plungers to thereby sinter the powder and give it the shape of the mold. This known hot pressing method, by using plungers, can manufacture sintered products of only relatively low density, however. Piston rings which have as a basis aluminum powder with heavy metal fillers therein, and which are made by this well known hot pressure method, then will have a relatively low density, low strength, and, particularly, comparatively low capability of being stretched. Although such piston rings do have good sliding properties, the relatively low expansion or dilation strength, the low ductility and comparatively high brittleness are undesirable, since these piston rings may break already when they are slipped over the the piston to then snap into the piston ring groove in which they are to be seated. There are limits to the thermal loading which piston rings having an aluminum base can tolerate, which thus limits application of the piston rings in internal combustion (IC) engines. In thermally highly loaded IC engines, such piston rings cannot be used without special and additional ways of cooling them. It is also difficult to use such piston rings in IC engines, such as large Diesel engines, which are to be operated with oil having a high sulfur content, such as heavy or residual or heavy fuel oil. Piston rings having an aluminum base are attacked by sulfuric acid which results as a byproduct of combustion within the cylinders of the engine at various locations therein.

THE INVENTION

It is an object to construct piston rings for internal combustion engines, particularly large Diesel engines, which are easy to make, can be highly thermally loaded, are resistant to corrosion and have long wear characteristics, and which are particularly adaptable to operate in engines being supplied with poor-quality fuel, such as heavy or residual oils having a high sulfur content; further, the piston rings should operate well even though lubrication of the piston ring-cylinder surface is poor, or has completely failed. The piston rings, of course, must have sufficient strength with respect to dilation and ductility, so that they can be readily mounted on the piston and retain the ductility during operation.

Briefly, piston rings in accordance with the invention have a base metal which is a mixture of particles of nickel- or cobalt- or copper-base alloys, and a filler metal which, for example, is comparatively soft and may contain unrefined graphite or galvanically nickel-plated graphite. The ratio of mixtures is about 40-80-%—by weight—of the base metal, the remainder being the filler. The mixture of particles of base metal and filler is subjected to hot isostatic compression to form the piston rings.

Hot isostatic compression is known and has been proposed in general to manufacture sinter products.

Hot isostatic compression is a process in which the receiving mold—in contrast to other compression processes—is made of relatively thin deformable wall portions. The compression mold is then introduced into an autoclave, and the isostatic hot compression process then includes application of heat—in accordance with the specific heat requirements of the materials being compressed—and uniform compression towards the material to be sintered from all sides, including deformation of the wall portions of the receiving mold, to thus sinter and compress the powder mixture within the mold and result in a high-density final structure.

EMBODIMENTS

A piston ring is made from a starting mixture having particles of a hard, wear-resistant, thermally high loadable base metal. This base metal is an alloy having a nickel- or cobalt-base and a soft filler material, such as unrefined or galvanically nickel-plated graphite. The mixing ratio is so selected that the base metal has 40-80-%—by weight—and the filler material the remaining percentages by weight, that is 60-20%.

A second embodiment starts from a mixture of particles of a softer material, for example bronze, and a thermally highly loadable, wear-resistant filler, such as an alloy based on nickel or cobalt. The mixing ratio is so selected that the base metal, in this case the softer material, contains 60-80% (by weight) and the hard filler the corresponding remaining proportion of weight, that is, 40-20%.

The hard-metal material, which is the base in the first embodiment and the filler in the second embodiment will have the following composition, with all values in percent by weight:

EXAMPLE 1 cobalt: 40-70
nickel: 0-20
chromium: 1-40
molybdenum: 10-40
tungsten: 0-20
silicon: 1-5
iron: 0-5

As an alternative, the hard base metal of the first embodiment or the hard filler of the second embodiment, when utilizing a nickel-base alloy, will have the following composition (all figures in percentages by weight):

EXAMPLE 2 nickel: 40-70 cobalt: 0–30
chromium: 1–40
molybdenum: 10–40
tungsten: 0–20
silicon: 1–5
iron: 0–5

The cobalt-base or nickel-base alloys of Examples 1, 2, above, which form either the hard-base metal of the first embodiment or the filler of the second embodiment, are materials which are known per se, and have previously been used as armoring or cladding for valve seats of IC engines.

In the first embodiment, first, the filler material is soft and, as discussed, may be unrefined graphite. As an alternative, galvanically nickel-coated graphite with 10–40% (by weight) graphite content—the remainder nickel—may be used.

In the second embodiment, the soft base metal is a bronze which, for example, may have the following composition (all percentages by weight):

EXAMPLE 3 copper: 80
tin: 10
lead: 10

METHOD OF MANUFACTURE

Base material and filler material, provided in powder form of suitable grain size of the various particles, are mixed. The powder mixture is then introduced into a mold vessel. The mold vessel is closed after filling of the powder mixture. In accordance with the characteristic of the isostatic hot-pressure process, the vessel or mold has wall portions which are thin and deformable. The mold form is then introduced into an autoclave where, in accordance with the isostatic hot-pressure process, heat is applied of sufficient intensity to provide for sintering while additionally pressure is applied from all sides, deforming the walls of the vessel, to compress and sinter the powder mixture within the mold vessel to form a dense final structure.

The piston rings, due to the pairing of hard and soft material, can be thermally highy loaded, are highly resistant against wear, and resistant to corrosion, particularly against sulphuric acids and other corrosive residues which occur within the cylinders of IC engine operated with residual oils. A further advantage of the piston rings is their ability to operate for limited periods of time without lubrication or under only minimal and insufficient lubricant. The piston rings, nevertheless, have high strength and ductile, so that they can be mounted on the pistons without difficult, and will provide, in use, trouble-free operation.

Suitable grain or powder sizes are as follows:

first embodiment, cobalt-based base mixture: 10–250μ
first embodiment, nickel-based base mixture: 10–250μ
first embodiment, graphite filler: 10–250μ
second embodiment, soft bronze base: 10–250μ
second embodiment, hard filler: 10–250μ

Suitable sintering temperatures and pressures in the hot isostatic compression step follow.

The compression is maintained, under the maximum temperature of ca. 1200° C. for ca. 180 minutes and, after release of pressure, the piston rings can be removed for cooling to ambient temperature and subsequent assembly with pistons.

The Co-Cr-Mo alloys and the Ni-Cr-Mo alloys which form either the hard-base metal of the first embodiment or the filler of the second embodiment are of the type used as armoring or clotting materials for valve seats. The cobalt-base and nickel-base alloys preferably comprise alloys selected from the following preferred alloy ranges.

PREFERRED COBALT-BASE ALLOYS cobalt: 40–70%
nickel: 0–20%
chromium: 1–40%
molybdenum: 10–40%
tungsten: 0–20%
silicon: 1–5%
iron: 0–5%

PREFERRED NICKEL-BASE ALLOYS nickel: 40–70%
cobalt: 0–30%
chromium: 1–40%
molybdenum: 10–40%
tungsten: 0–20%
silicon: 1–5%
iron: 0–5%

Specific preferred cobalt-base alloys and nickel-base alloys follow:

PREFERRED COBALT-BASE ALLOYS cobalt: 62%
nickel: —
chromium: 8%
molybdenum: 28%
tungsten: —
silicon: 2%
iron: —

PREFERRED NICKEL-BASE ALLOYS nickel: 50%
cobalt: —
chromium: 15%
molybdenum: 32%
tungsten: —
silicon: 3%
iron: —

An example of the first embodiment of the invention is provided by utilizing the above-noted cobalt-base alloy in powder form together with unrefined graphite in an amount of 10 to 60% by weight. Another embodiment utilizes nickel coated graphite instead of the unrefined graphite.

An example of the second embodiment of the invention is provided by utilizing the above-noted nickel-base alloy in powder form together with unrefined graphite in an amount of 10 to 60% by weight. Another embodiment utilizes nickel coated graphite instead of the unrefined graphite.

Bronze powders generally are useful as the soft base metal in the second embodiment of the invention. The bronze alloy of Example 3, when used together with the specific cobalt-base alloy powders and/or nickel-base alloy powders disclosed hereinbefore in an amount of 70% by weight of the bronze powder and 30% by weight of the cobalt-base alloy powder and/or nickel-base alloy powder provided the improved piston rings of the present invention.

When the cobalt-base metal and/or the nickel-base metal is used as the base metal particles and the graphite is used as the filler, the metal powders are preferably used in an amount between 40 and 90%, and the graphite filler in an amount between 10 and 60%.

When the bronze powder is used as the base metal and the cobalt-base powders and/or nickel-base powders are used as the filler, the bronze powders are preferably in an amount between 60 and 80%, and the cobalt- and/or nickel-base powders in an amount between 20% and 40%.

REFERENCE

Publication "Intermetallische Tribaloy-Werkstofte—Neue Verschleiss- und Korrosiousbeständige Legierungen," C. B. Cameron und D. P. Ferriss, Kobalt 1974, Heft3, Seiten 47–51, and the corresponding English-language article printed in the publication "COBALT" 1974, No. 3, published by the Cobalt Information Centre which was reprinted in "ANTI-CORROSION", April 1975, pages 5–8 which is hereby incorporated by reference.

I claim:

1. Piston ring for an internal combustion engine comprising
    a mixture of two powdered components which are sintered together under high pressure and temperature,
    the first component comprises between 40 and 90% by weight of a hard wear-resistant and heat resistant nickel base or cobalt base alloy armoring metal; and
    the second component comprising unrefined or nickel coated graphite which forms the remainder;
    and wherein said mixture of said two components is sintered by isostatic hot compression of the powdered mixture to form said piston ring.

2. The piston ring of claim 1, wherein said second component comprises electro-nickel-coated graphite in which the graphite is present in 10–40%, the remainder being said nickel base alloy.

3. The piston ring of claim 1 wherein said ring is formed from powdered particles of said two components having particle sizes between 10 and 250$\mu$.

4. The piston ring of claim 3 wherein said heat resistant nickel base or cobalt base alloy armoring metal consists essentially of 62% by weight of cobalt, 8% chromium, 28% molybdenum and 2% silicon.

5. The piston ring of claim 3 wherein said heat resistant nickel base or cobalt base alloy armoring metal consists essentially of 50% by weight nickel, 15% chromium, 32% molybdenum and 3% silicon.

6. the piston ring of claim 1 wherein said hard armoring metal is in an amount between 40% and 80% by weight and said graphite filler is in an amount between 20% and 60%.

7. The piston ring of claim 6 wherein said hard armoring metal is a cobalt-base alloy consisting essentially of 62% by weight cobalt, 8% chromium, 28% molybdenum and 2% silicon.

8. The piston ring of claim 6 wherein said hard armoring metal is a nickel-base alloy consisting essentially of 50% by weight nickel, 15% chromium, 32% molybdenum and 3% silicon.

9. The piston ring of claims 1 or 6, wherein said hard armoring metal is a cobalt-base alloy comprises a material having the composition, with the percentages by weight,
    cobalt: 40–70
    nickel: 0–20
    chromium: 1–40
    molybdenum: 10–40
    tungsten: 0–20
    silicon: 1–5
    iron: 0–5.

10. The piston ring of claims 1 or 6, wherein said hard armoring metal is a nickel-base alloy comprises a material having the composition, with the percentages by weight,
    nickel: 40–70
    cobalt: 0–30
    chromium: 1–40
    molybdenum: 10–40
    tungsten: 0–20
    silicon: 1–5
    iron: 0–5.

* * * * *